(12) United States Patent
Liu (10) Patent No.: US 12,554,472 B2
(45) Date of Patent: Feb. 17, 2026

(54) HOOK METHOD AND APPARATUS FOR COMPILE TIME, DEVICE, AND STORAGE MEDIUM

(71) Applicant: Beijing Bytedance Network Technology Co., Ltd., Beijing (CN)

(72) Inventor: Fengkai Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 18/275,577

(22) PCT Filed: Jan. 24, 2022

(86) PCT No.: PCT/CN2022/073580
§ 371 (c)(1),
(2) Date: Aug. 2, 2023

(87) PCT Pub. No.: WO2022/166669
PCT Pub. Date: Aug. 11, 2022

(65) Prior Publication Data
US 2024/0311111 A1    Sep. 19, 2024

(30) Foreign Application Priority Data
Feb. 5, 2021   (CN) .......................... 202110164407.8

(51) Int. Cl.
*G06F 8/41*    (2018.01)
(52) U.S. Cl.
CPC .............. *G06F 8/447* (2013.01); *G06F 8/427* (2013.01)
(58) Field of Classification Search
None
See application file for complete search history.

(56) References Cited

U.S. PATENT DOCUMENTS

| | | |
|---|---|---|
| 2007/0055966 A1 | 3/2007 | Waddington et al. |
| 2013/0159976 A1 | 6/2013 | Jazdzewski et al. |

(Continued)

FOREIGN PATENT DOCUMENTS

| | | |
|---|---|---|
| CN | 106990955 A | 7/2017 |
| CN | 110149800 A | 8/2019 |

(Continued)

OTHER PUBLICATIONS

Gucevska, Zhivka, "The Operational Semantics and Implementation of a Core Dart Language," École Polytechnique Fédérale de Lausanne, 2017. (Year: 2017).*

(Continued)

*Primary Examiner* — Ryan D. Coyer
(74) *Attorney, Agent, or Firm* — Astute IP Law Group (57) ABSTRACT

Provided are a hook method and apparatus for compile time, a device, and a storage medium. The method includes: first, receiving a hook code file and a target program source code (S101), the hook code file including a correspondence between predetermined locating information and a predetermined object processing scheme; converting the target program source code into an abstract syntax tree, and then determining a node in the abstract syntax tree corresponding to the predetermined locating information in the hook code file (S102); modifying the node in the abstract syntax tree corresponding to the predetermined locating information in the hook code file by using the predetermined object processing scheme corresponding to the predetermined locating information in the hook code file, to obtain an updated abstract syntax tree (S103); and finally, generating a target program based on the updated abstract syntax tree (S104).

10 Claims, 2 Drawing Sheets

(56) References Cited

U.S. PATENT DOCUMENTS

| | | | | |
|---|---|---|---|---|
| 2016/0179484 | A1* | 6/2016 | Yan | G06F 9/445 |
| | | | | 718/104 |
| 2019/0227904 | A1 | 7/2019 | Raviv et al. | |
| 2020/0150951 | A1* | 5/2020 | Kimball | G06F 8/72 |
| 2020/0210157 | A1* | 7/2020 | Munaganuru | G06F 16/2428 |
| 2021/0096832 | A1* | 4/2021 | Rich | G06F 40/154 |
| 2022/0012020 | A1* | 1/2022 | Barke | G06N 20/00 |
| 2022/0237254 | A1* | 7/2022 | Li | G06F 16/9577 |

FOREIGN PATENT DOCUMENTS

| | | |
|---|---|---|
| CN | 110633567 A | 12/2019 |
| CN | 111090433 A | 5/2020 |
| CN | 111352849 A | 6/2020 |
| CN | 111488154 A | 8/2020 |
| CN | 111684766 A | 9/2020 |
| CN | 111736840 A | 10/2020 |
| CN | 112799677 A | 5/2021 |

OTHER PUBLICATIONS

Springer et al., "dart2java: Running Dart in Java-based Environments," ACM, 2017. (Year: 2017).*
Van Tonder et al., "Lightweight Multi-Language Syntax Transformation with Parser Parser Combinators," ACM, 2019. (Year: 2019).*
Office Action in CN202110164407.8, mailed Jul. 1, 2023, 5 pages.
International Search Report in PCT/CN2022/073580, mailed Apr. 19, 2022, 4 pages.

* cited by examiner

HOOK METHOD AND APPARATUS FOR COMPILE TIME, DEVICE, AND STORAGE MEDIUM

CROSS-REFERENCE TO RELATED APPLICATIONS

This is a national stage application filed under 37 U.S.C. 371 based on International Patent Application No. PCT/CN2022/073580, filed Jan. 24, 2022, which claims priority to the Chinese patent application No. 202110164407.8, filed on Feb. 5, 2021, titled "HOOK METHOD AND APPARATUS FOR COMPILE TIME, DEVICE, AND STORAGE MEDIUM", the disclosures of which are incorporated herein by reference in their entireties.

FIELD

The present disclosure relates to the field of data processing and, more particularly, to a hook method and apparatus for compile time, a device, and a storage medium.

BACKGROUND

In the project development process, upon the completion of code development for an application program, it is necessary to compile a program source code before obtaining an executable file that can be installed and run on a computer device.

In practical applications, in the case of additional functional requirements after the completion of the code development, conventionally the developers have to manually modify the program source code to update the functions of the application program, and then compile the modified program source code to obtain the executable file. This manner meets the need of adding new functions but is wasteful of time and less efficient in realizing the function updating.

SUMMARY

To solve or at least partially solve the aforementioned technical problem, the present disclosure provides a hook method and apparatus for compile time, a device, and a storage medium, which can modify a specified object in a target program source code by executing the hook method for compile time so that function updating is realized in a target program obtained after the compiling.

In a first aspect, the present disclosure provides a hook method for compile time, including: receiving a hook code file and a target program source code, wherein the hook code file includes a correspondence between predetermined locating information and a predetermined object processing scheme, and the predetermined locating information is used for identifying an object in the target program source code: converting the target program source code into an abstract syntax tree, and determining a node in the abstract syntax tree corresponding to the predetermined locating information in the hook code file, wherein the node in the abstract syntax tree is in correspondence with the object in the target program source code: modifying the node in the abstract syntax tree corresponding to the predetermined locating information by using the predetermined object processing scheme corresponding to the predetermined locating information in the hook code file, to obtain an updated abstract syntax tree; and generating a target program based on the updated abstract syntax tree.

In an optional embodiment, the predetermined object processing scheme includes an object replacement scheme or an object modification scheme; and said modifying the node in the abstract syntax tree corresponding to the predetermined locating information by using the predetermined object processing scheme corresponding to the predetermined locating information in the hook code file, to obtain the updated abstract syntax tree includes: replacing the node in the abstract syntax tree corresponding to the predetermined locating information with a specified object in the object replacement scheme by using the object replacement scheme corresponding to the predetermined locating information in the hook code file, to obtain the updated abstract syntax tree; or modifying a logic content in the node in the abstract syntax tree corresponding to the predetermined locating information by using the object modification scheme corresponding to the predetermined locating information in the hook configuration file, to obtain the updated abstract syntax tree.

In an optional embodiment, the hook method further includes, prior to said receiving the hook code file and the target program source code: marking locating information of a target object in the target program source code as the predetermined locating information based on a predetermined marking mechanism.

In an optional embodiment, the predetermined locating information includes file position information, a class name, and a method name.

In an optional embodiment, the target program source code is a Dart program source code: said determining the node in the abstract syntax tree corresponding to the predetermined locating information in the hook code file includes: determining nodes in the abstract syntax tree corresponding to the file position information in the predetermined locating information as first nodes based on the predetermined locating information in the hook code file: determining nodes corresponding to the class name in the predetermined locating information from the first nodes as second nodes; and determining a node corresponding to the method name in the predetermined locating information from the second nodes as a third node; and said modifying the node in the abstract syntax tree corresponding to the predetermined locating information by using the predetermined object processing scheme corresponding to the predetermined locating information in the hook code file, to obtain the updated abstract syntax tree includes: modifying the third node in the abstract syntax tree by using the predetermined object processing scheme corresponding to the predetermined locating information in the hook code file, to obtain the updated abstract syntax tree.

In an optional embodiment, the method further includes, prior to receiving the hook code file and the target program source code: receiving source code parameter information inputted by a user, and adding the source code parameter information to a predetermined file template; and receiving an object processing scheme written into the predetermined file template to obtain the hook code file.

In a second aspect, the present disclosure provides a hook apparatus for compile time, including: a receiving module configured to receive a hook code file and a target program source code, wherein the hook code file includes a correspondence between predetermined locating information and a predetermined object processing scheme, and the predetermined locating information is used for identifying an object in the target program source code: a converting module configured to convert the target program source code into an abstract syntax tree: a determining module configured to determine a node in the abstract syntax tree corresponding to predetermined locating information in the hook code file, wherein the node in the abstract syntax tree is in correspondence with the object in the target program source code: a modifying module configured to modify the node in the abstract syntax tree corresponding to the predetermined locating information by using the predetermined object processing scheme corresponding to the predetermined locating information in the hook code file, to obtain an updated abstract syntax tree, wherein the modified program code is used for generating an executable file; and a generating module configured to generate a target program based on the updated abstract syntax tree.

In an optional embodiment, the predetermined object processing scheme includes an object replacement scheme or an object modification scheme: the modifying module includes: a replacement sub-module configured to replace the node in the abstract syntax tree corresponding to the predetermined locating information with a specified object in the object replacement scheme by using the object replacement scheme corresponding to the predetermined locating information in the hook code file, to obtain the updated abstract syntax tree: or a modification sub-module configured to modify a logic content in the node in the abstract syntax tree corresponding to the predetermined locating information by using the object modification scheme corresponding to the predetermined locating information in the hook code file, to obtain the updated abstract syntax tree.

In a third aspect, the present disclosure provides a computer-readable storage medium having instructions stored therein. The instructions, when executed on a terminal device, cause the terminal device to implement the method described above.

In a fourth aspect, the present disclosure provides a device, including: a memory, a processor, and a computer program stored on the memory and executable on the processor. The processor, when executing the computer program, implements the method described above.

In a fifth aspect, the present disclosure provides a computer program product including a computer program/instructions. The program/instructions, when executed by a processor, implement the method described above.

The technical solutions provided by the embodiments of the present disclosure have the following advantages over the related art.

The embodiments of the present disclosure provide a hook method for compile time. The method includes: first, receiving a hook code file and a target program source code. The hook code file includes a correspondence between predetermined locating information and a predetermined object processing scheme, and the predetermined locating information is used for identifying an object in the target program source code. Then, after the target program source code is converted into an abstract syntax tree, a node in the abstract syntax tree corresponding to the predetermined locating information in the hook code file is determined; and the node in the abstract syntax tree corresponding to the predetermined locating information is modified by using the predetermined object processing scheme corresponding to the predetermined locating information in the hook code file, to obtain an updated abstract syntax tree. Ultimately, a target program is generated based on the updated abstract syntax tree.

According to the embodiments of the present disclosure, the node in the abstract syntax tree of the target program source code is modified at compile time through the hook method so that function updating is realized in a target program obtained after compilation. Compared with the manner for realizing function updating in the related art, the method is time-saving, improves the function updating efficiency, and economizes system resources.

BRIEF DESCRIPTION OF DRAWINGS

The accompanying drawings, which are incorporated herein and constitute a part of this description, illustrate embodiments consistent with the disclosure and, together with the description, serve to explain the principles of the disclosure.

To explain the technical solutions in the embodiments of the present disclosure or the related art more clearly, a brief description will be given below to illustrate the drawings used in the description of the embodiments or the related art, and apparently, a person skilled in the art may obtain other drawings according to these drawings without creative efforts.

DESCRIPTION OF EMBODIMENTS

In order to understand the aforementioned object, features, and advantages of the present disclosure more clearly, the solutions of the present disclosure will be further described below. It is noted that embodiments of the present disclosure and features of the embodiments may be combined with each other without conflict.

In the description below, many specific details are set forth in order to provide a thorough understanding of the present disclosure, but the present disclosure may be implemented in other manners different from those described herein. It is to be understood that the embodiments in the description are only some rather than all embodiments of the present disclosure.

In a project development process, in the case of a change in business requirements, generally, the developers manually modify a program source code before compiling the program source code to update product functions.

However, the code quantity of the program source code is generally large, and modification is required at many positions in the code. It is difficult, inefficient, and error-prone for the developers to update product functions by manually modifying the program source code. To this end, the present disclosure provides a hook method for compile time, which modifies a node in an abstract syntax tree of the target program source code in the process of compiling a target program source code, so that the function updating is realized in a target program obtained after compilation. Compared with the manner for realizing the function updating in the related art, this method is time-saving, improves the function updating efficiency, and saves system resources.

Specifically, the hook method for compile time provided by the present disclosure includes: first, receiving a hook code file and a target program source code. The hook code file includes a correspondence between predetermined locating information and a predetermined object processing scheme, and the predetermined locating information is used for identifying an object in the target program source code. Then, after the target program source code is converted into an abstract syntax tree, a node in the abstract syntax tree corresponding to the predetermined locating information in the hook code file is determined, and the node in the abstract syntax tree corresponding to the predetermined locating information is modified by using the predetermined object processing scheme corresponding to the predetermined locating information in the hook code file, to obtain an updated abstract syntax tree. Ultimately, a target program is generated based on the updated abstract syntax tree.

Figure 1:
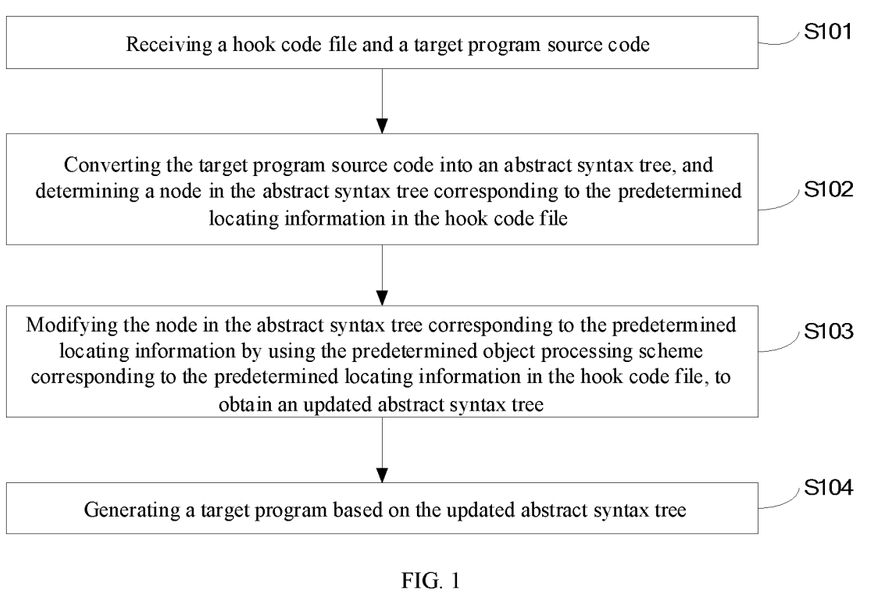
FIG. 1 is a flowchart of a hook method for compile time according to an embodiment of the present disclosure.

On this basis, an embodiment of the present disclosure provides a hook method for compile time. FIG. 1 illustrates a flowchart of the hook method for compile time according to the embodiment of the present disclosure. As shown in FIG. 1, the hook method includes the following operations.

At S101, a hook code file and a target program source code are received.

Herein, the hook code file includes a correspondence between predetermined locating information and a predetermined object processing scheme, and the predetermined locating information is used for identifying an object in the target program source code.

The hook is a technology to intercept the original execution process of a program and add a predetermined processing logic.

In the embodiment of the present disclosure, the hook method is implemented at compile time of the program source code, and is used to modify a specified node in an abstract syntax tree at compile time of the program source code so that function updating is realized in a target program after compiling.

The target program source code in the embodiment of the present disclosure may be a program source code developed based on any one of programming languages. For example, the target program source code may be a Dart program source code.

In the embodiment of the present disclosure, the correspondence between the predetermined locating information and the predetermined object processing scheme in one or more pairs may be included in the hook code file, where the predetermined locating information is used for locating a target object in the target program source code, and the predetermined object processing scheme is used for specifying a processing logic for the target object located according to the corresponding predetermined locating information.

In practical applications, the hook code file may be obtained by a user manually writing the code. In addition, the hook code file may alternatively be automatically generated based on a predetermined file template and source code parameter information inputted by a user. Specifically, firstly, the source code parameter information inputted by the user is received, and the source code parameter information is added into the predetermined file template. Then, the object processing scheme written into the predetermined file template is received to obtain the hook code file, where the hook code file may be used for implementing the hook method for compile time. As shown below, an example of the hook code file according to an embodiment of the present disclosure is provided, where the source code parameter information inputted by the user includes: 'package:http/src/base_client.dart', 'BaseClient' and '_sendUnstreamed'; and the object processing scheme is sendUnstreamed used for intercepting network requests.

```
@Method(
    importUri: 'package:http/src/base_client.dart',
    className: 'BaseClient',
    methodName: '_sendUnstreamed',
    type: Type.RUN,
)
@pragma('vm:entry-point')
Future<Response> _sendUnstreamed(StubCut context) async {
    Future<Response> res;
    if (StaticVariableManager.hasAttached) {
        debugPrint('ume: http/src/base_client.dart send hooked');
        final request = buildRequest(context.positionalParams);
        int id = NetworkDataManager( ).joinRequest(request);
        res = context.exec( );
        Response resp = await res;
        if (NetworkDataManager( ).allRulesKeys.isNotEmpty) {
            res = Future<Response>.value(_applyRules(resp));
        }
        NetworkDataManager( ).joinResponse(id, await res);
    } else {
        res = context.exec( );
    }
    return res;
}
```

In an optional embodiment, the source code parameter information may include a correspondence between file position information, a class name, and a method name. Herein, the file position information is used for identifying a file, the file includes at least one class, and the class includes at least one method. Based on the correspondence between the file position information, the class name, and the method name, a target method can be located as a hook object.

In practical applications, a user specifies the hook object in the target program source code by inputting the source code parameter information. Specifically, the source code parameter information inputted by the user, after being added to the predetermined file template, serves as predetermined locating information in a generated hook code file. In addition, an object processing scheme is written into the predetermined file template as the predetermined object processing scheme corresponding to the predetermined locating information in the generated hook code file, and the predetermined object processing scheme is used for defining a processing logic of the hook object corresponding to the predetermined locating information.

In an optional embodiment, the locating information of the target object in the target program source code may be marked based on a predetermined marking mechanism as the predetermined locating information in the embodiment of the present disclosure for locating the hook object.

At S102, the target program source code is converted into an abstract syntax tree, and a node in the abstract syntax tree corresponding to the predetermined locating information in the hook code file is determined.

Herein, the node in the abstract syntax tree is in correspondence with the object in the target program source code.

In the embodiment of the present disclosure, in the process of compiling the target program source code, the target program source code is converted into an abstract syntax tree, where the nodes in the abstract syntax tree are in correspondence with syntax elements in the target program source code, and the syntax elements may include Component, Library, Class, Procedure, and Field, etc.

Specifically, the process of converting the target program source code into the abstract syntax tree is a parsing process during source code compiling, a more detailed implementation of which is not given herein.

In the embodiment of the present disclosure, after the abstract syntax tree corresponding to the target program source code is obtained, a node corresponding to the predetermined locating information in the hook code file is determined from the abstract syntax tree based on the predetermined locating information in the hook code file.

Figure 2:
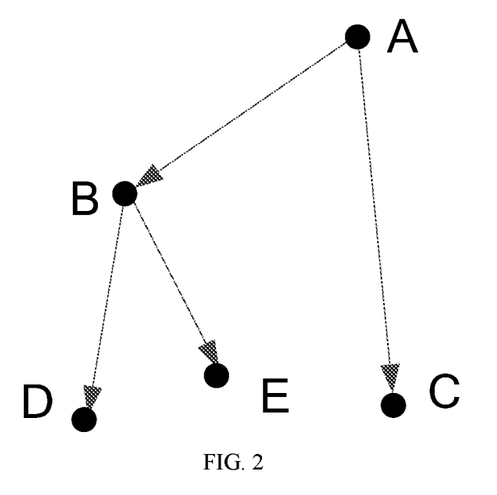
FIG. 2 is a partial structural diagram of an abstract syntax tree according to an embodiment of the present disclosure.

In an optional embodiment, the predetermined locating information includes a correspondence between the file position information, the class name, and the method name, and in order to determine a node in the abstract syntax tree corresponding to the predetermined locating information in the hook code file, it is possible to first determine nodes in the abstract syntax tree corresponding to the file position information in the predetermined locating information in the hook code file as first nodes. Specifically, the first nodes may refer to respective child nodes that take a node corresponding to a file identified by the file position information as a parent node.

With reference to FIG. 2, a partial structural diagram of an abstract syntax tree according to an embodiment of the present disclosure is illustrated. Provided that a node corresponding to a file identified by the file position information in the predetermined locating information is node A, child nodes B, C, D, and E that take node A as the parent node are all first nodes.

After the first nodes are determined from the abstract syntax tree, based on the class name corresponding to the file position information in the predetermined locating information, second nodes corresponding to the class name are determined from the first nodes. As shown in FIG. 2, provided that a node corresponding to a class identified by the class name is node B, child nodes D and E that take node B as the parent node are second nodes.

After the second nodes are determined from the abstract syntax tree, based on the method name corresponding to the class name in the predetermined locating information, a third node corresponding to the method name is determined from the second nodes. As shown in FIG. 2, provided that a node corresponding to a method identified by the method name is node D, node D is determined as the third node and also as a modification target in the embodiment of the present disclosure.

At S103, the node in the abstract syntax tree corresponding to the predetermined locating information is modified by using the predetermined object processing scheme corresponding to the predetermined locating information in the hook code file, to obtain an updated abstract syntax tree.

In the embodiment of the present disclosure, after the node in the abstract syntax tree corresponding to the predetermined locating information in the hook code file is determined, a predetermined object processing scheme that is in correspondence with the predetermined locating information is determined from the hook code file, and then the node determined is modified by using the predetermined object processing scheme, to obtain the updated abstract syntax tree.

In practical applications, when there is a correspondence between the predetermined locating information and the predetermined object processing scheme in a plurality of pairs in the hook code file, a respective node is processed based on the correspondence for each pair, so as to finally update the abstract syntax tree and obtain the updated abstract syntax tree.

At S104, a target program is generated based on the updated abstract syntax tree.

In the embodiment of the present disclosure, in the process of compiling the target program source code, after the updated abstract syntax tree is obtained, the compiling continues based on the updated abstract syntax tree to finally generate the target program. Since some nodes are modified in the updated abstract syntax tree, function updating is thus realized in the target program generated based on the updated abstract syntax tree.

The hook method for compile time provided by the embodiments of the present disclosure includes: first, receiving a hook code file and a target program source code. The hook code file includes a correspondence between predetermined locating information and a predetermined object processing scheme, and the predetermined locating information is used for identifying an object in the target program source code. Then, after the target program source code is converted into an abstract syntax tree, a node in the abstract syntax tree corresponding to the predetermined locating information in the hook code file is determined, and the node in the abstract syntax tree corresponding to the predetermined locating information is modified by using the predetermined object processing scheme corresponding to the predetermined locating information in the hook code file, to obtain an updated abstract syntax tree. Finally, a target program is generated based on the updated abstract syntax tree. Compared with the manner for realizing the function updating in the related art, this method is time-saving, improves the function updating efficiency, and saves system resources.

Based on the above embodiments, the present disclosure further provides the following two implementations of modifying the node in the abstract syntax tree.

In practical applications, the predetermined object processing scheme contained in the hook code file is an object replacement scheme or an object modification scheme. Herein, the object replacement scheme is used for specifying a processing logic for replacing the node corresponding to the predetermined locating information with a specified object. The object modification scheme is used for specifying a processing logic for modifying a logic content in the node corresponding to the predetermined locating information.

In an optional embodiment, when the predetermined object processing scheme in correspondence with the predetermined locating information in the hook code file is the object replacement scheme, after the node corresponding to the predetermined locating information is determined from the abstract syntax tree, the object replacement scheme is used to replace the node in the abstract syntax tree corresponding to the predetermined locating information with a specified object in the object replacement scheme, to update the abstract syntax tree and obtain the updated abstract syntax tree.

In another optional embodiment, when the predetermined object processing scheme in correspondence with the predetermined locating information in the hook code file is the object modification scheme, after the node corresponding to the predetermined locating information is determined from the abstract syntax tree, the object modification scheme is used to modify the logic content in the node in the abstract syntax tree corresponding to the predetermined locating information, to update the abstract syntax tree and obtain the updated abstract syntax tree.

In the embodiment of the present disclosure, after the completion of the updating of the abstract syntax tree corresponding to the target program source code based on the correspondence for each pair of the predetermined locating information and the predetermined object processing scheme in the hook code file, the updated abstract syntax tree is obtained, and then a subsequent compiling flow is executed based on the updated abstract syntax tree to finally obtain the target program.

According to the hook method for compile time provided by the embodiments of the present disclosure, in the process of compiling the target program source code, it is possible to not only modify the implementation logic of the object in the target program source code through the hook method, but also replace the object in the target program source code through the hook method, so that the function updating is realized in the target program obtained after the compiling. This is time saving, improves the function updating efficiency, and saves system resources. In practical applications, the hook method for compile time provided by the present disclosure may be applied to several application scenarios as follows.

In an optional application scenario, the hook method for compile time provided by the present disclosure may be applied to a compiler deployed on a local device, and in particular, the compiler may be a compiler corresponding to any programming language, such as a Dart compiler.

Specifically, the hook method for compile time provided by the embodiment of the present disclosure may be executed when the compiler compiles the target program source code, to update a specified function in the target program source code at compile time.

In another optional application scenario, the hook method for compile time provided by the embodiments of the present disclosure may be implemented by a cloud platform in conjunction with a local device. Specifically, a client is installed in the local device, and a compiler is deployed on the cloud platform: after the hook code file and the target program source code are received by the client, the hook code file and the target program source code are uploaded to the cloud platform, and subsequently the compiler deployed on the cloud platform executes the hook method for compile time provided by the embodiment of the present disclosure based on the received hook code file and target program source code, to update a specified function in the target program source code at compile time, and finally generate the target program. In addition, the cloud platform may distribute the generated target program to the client.

In the above application scenario, a plurality of compilers may be deployed on the cloud platform, and the plurality of compilers may include compilers respectively corresponding to different programming languages, for example, including a Dart compiler, a java compiler, etc. In practical applications, a compiler on the cloud platform may be specified as a target compiler by a client user, and then the target compiler is used to execute the hook method for compile time provided by the embodiment of the present disclosure, to realize the compiling of the target program source code.

In another optional application scenario, the hook method for compile time provided by the embodiment of the present disclosure may be applied as a plug-in function of a compiler in a plug-in unit that is installable into the compiler.

In fact, the hook method for compile time provided by the embodiment of the present disclosure may further be applied to various other application scenarios, which are not limited in the present disclosure.

Figure 3:
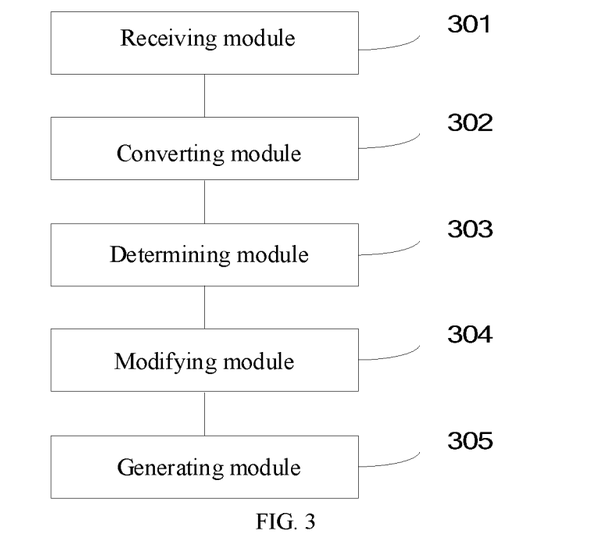
FIG. 3 is a schematic structural diagram of a hook apparatus for compile time according to an embodiment of the present disclosure.

Based on the aforementioned method embodiments, the present disclosure further provides a hook apparatus for compile time. As shown in FIG. 3, a schematic structural diagram of a hook apparatus for compile time provided by an embodiment of the present disclosure is illustrated, and the hook apparatus includes: a receiving module 301, a converting module 302, a determining module 303, a modifying module 304, and a generating module 305.

The receiving module 301 is configured to receive a hook code file and a target program source code. The hook code file includes a correspondence between predetermined locating information and a predetermined object processing scheme, and the predetermined locating information is used for identifying an object in the target program source code.

The converting module 302 is configured to convert the target program source code into an abstract syntax tree:

The determining module 303 is configured to determine a node in the abstract syntax tree corresponding to the predetermined locating information in the hook code file.

The modifying module 304 is configured to modify the node in the abstract syntax tree corresponding to the predetermined locating information by using the predetermined object processing scheme corresponding to the predetermined locating information in the hook code file, to obtain an updated abstract syntax tree. The modified program code is used for generating an executable file.

The generating module 305 is configured to generate a target program based on the updated abstract syntax tree.

In an optional embodiment, the predetermined object processing scheme includes an object replacement scheme or an object modification scheme; and the modifying module includes: a replacement sub-module configured to replace the node in the abstract syntax tree corresponding to the predetermined locating information with a specified object in the object replacement scheme by using the object replacement scheme corresponding to the predetermined locating information in the hook code file to, to obtain the updated abstract syntax tree: or a modification sub-module configured to modify a logic content in the node in the abstract syntax tree corresponding to the predetermined locating information by using the object modification scheme corresponding to the predetermined locating information in the hook code file, to obtain the updated abstract syntax tree.

In an optional embodiment, the apparatus further includes a marking module configured to mark locating information of a target object in the target program source code as the predetermined locating information based on a predetermined marking mechanism.

In an optional embodiment, the predetermined locating information includes file position information, a class name, and a method name.

In an optional embodiment, the target program source code is a Dart program source code, and the determining module includes: a first determining sub-module, a second determining sub-module, and a third determining sub-module.

The first determining sub-module is configured to determine, based on the predetermined locating information in the hook code file, nodes in the abstract syntax tree corresponding to the file position information in the predetermined locating information as first nodes.

The second determining sub-module is configured to determine nodes corresponding to the class name in the predetermined locating information from the first nodes as second nodes.

The third determining sub-module is configured to determine a node corresponding to the method name in the predetermined locating information from the second nodes as a third node.

Accordingly, the modifying module is specifically configured to modify the third node in the abstract syntax tree by using the predetermined object processing scheme corresponding to the predetermined locating information in the hook code file, to obtain the updated abstract syntax tree.

In an optional embodiment, the apparatus further includes: an adding module configured to receive source code parameter information inputted by a user, and add the source code parameter information to a predetermined file template; and a writing module configured to receive an object processing scheme written into the predetermined file template to obtain the hook code file.

In the hook apparatus for compile time provided by the embodiments of the present disclosure, first, a hook code file and a target program source code are received. The hook code file includes a correspondence between predetermined locating information and a predetermined object processing scheme, and the predetermined locating information is used for identifying an object in the target program source code. Then, after the target program source code is converted into an abstract syntax tree, a node in the abstract syntax tree corresponding to the predetermined locating information in the hook code file is determined, and the node in the abstract syntax tree corresponding to the predetermined locating information is modified by using the predetermined object processing scheme corresponding to the predetermined locating information in the hook code file, to obtain an updated abstract syntax tree. Finally, a target program is generated based on the updated abstract syntax tree. The function updating realized by the hook apparatus according to the present disclosure is time-saving, improves the function updating efficiency, and saves system resources, compared with the manner for realizing function updating in the related art.

In addition to the method and apparatus described above, embodiments of the present disclosure provide a computer-readable storage medium having instructions stored therein. The instructions, when executed on a terminal device, cause the terminal device to implement the hook method for compile time according to the embodiment of the present disclosure.

Embodiments of the present disclosure further provide a computer program product including a computer program/instructions that, when executed by a processor, implement the hook method for compile time according to the embodiment of the present disclosure.

Figure 4:
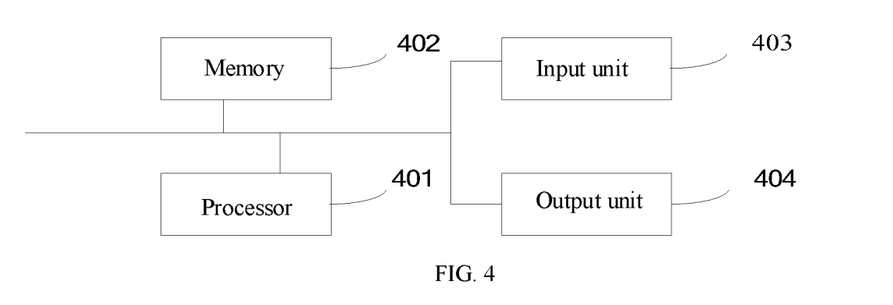
FIG. 4 is a schematic structural diagram of a hook device for compile time according to an embodiment of the present disclosure.

Furthermore, the embodiments of the present disclosure provide a hook device for compile time, which, as shown in FIG. 4, may include: a processor 401, a memory 402, an input unit 403, and an output unit 404. One or more processors 401 may be present in the hook device for compile time, and one processor is taken as an example in FIG. 4. In some embodiments of the present disclosure, the processor 401, the memory 402, the input unit 403, and the output unit 404 may be connected via a bus or other manners. The connection via a bus is exemplified in FIG. 4.

The memory 402 may be used to store software programs and modules, and the processor 401 is configured to execute the software programs and modules stored in the memory 402 to perform various functional applications of the hook device for compile time and data processing. The memory 402 may mainly include a program storage partition and a data storage partition, and the program storage partition may store an operating system, an application program required for at least one function, and the like. In addition, the memory 402 may include a high-speed random-access memory and may further include a non-volatile memory, e.g., at least one magnetic disk storage device, a flash memory device, or other volatile solid-state storage devices. The input unit 403 may be configured to receive inputted numeric or character information and generate signal inputs related to user settings and functional control of the hook device for compile time.

Specifically in an embodiment, the processor 401 loads executable files corresponding to processes of one or more application programs into the memory 402 according to the instructions herein, and the processor 401 executes the application programs stored in the memory 402 to realize various functions of the aforementioned hook device for compile time.

It is noted that relational terms such as "first" and "second" are used herein merely to distinguish one entity or operation from another entity or operation without necessarily requiring or implying any actual such relationship or order between the entities or operations. Furthermore, the terms "include", "comprise", or any other variation thereof, are intended to indicate a non-exclusive inclusion, such that a process, method, article, or apparatus that includes a list of elements not only includes those elements but may further include other elements not expressly listed or inherent to such process, method, article, or apparatus. In case of no more constraints, an element defined by the phrase "including a . . . " does not exclude the existence of additional elements that are same as the element in the process, method, article, or apparatus that includes the element.

The above description of the embodiments of the present disclosures is provided to enable those skilled in the art to understand or implement the present disclosure. Various modifications to these embodiments will be readily apparent to those skilled in the art, and the generic principles defined herein may be implemented in other embodiments without departing from the ideas or scope of the present disclosure. Thus, the present disclosure is not intended to be limited to the embodiments shown herein but is subject to the widest scope consistent with the principles and novel features disclosed herein.

What is claimed is:

1. A hook method for compile time, comprising:
receiving a hook code file and a target program source code, wherein the hook code file comprises a correspondence between predetermined locating information and a predetermined object processing scheme, and the predetermined locating information is used for identifying an object in the target program source code;
converting the target program source code into an abstract syntax tree, and determining a node in the abstract syntax tree corresponding to the predetermined locating information in the hook code file, wherein the node in the abstract syntax tree is in correspondence with the object in the target program source code;
modifying the node in the abstract syntax tree corresponding to the predetermined locating information by using the predetermined object processing scheme corresponding to the predetermined locating information in the hook code file, to obtain an updated abstract syntax tree; and
generating a target program based on the updated abstract syntax tree,
wherein the method further comprises, prior to said receiving the hook code file and the target program source code: marking locating information of a target object in the target program source code as the predetermined locating information based on a predetermined marking mechanism,
wherein the predetermined locating information comprises file position information, a class name, and a method name, wherein the target program source code is a Dart program source code,
said determining the node in the abstract syntax tree corresponding to the predetermined locating information in the hook code file comprises:
determining nodes in the abstract syntax tree corresponding to the file position information in the predetermined locating information as first nodes based on the predetermined locating information in the hook code file;
determining nodes corresponding to the class name in the predetermined locating information from the first nodes as second nodes; and
determining a node corresponding to the method name in the predetermined locating information from the second nodes as a third node; and
said modifying the node in the abstract syntax tree corresponding to the predetermined locating information by using the predetermined object processing scheme corresponding to the predetermined locating information in the hook code file, to obtain the updated abstract syntax tree comprises:
modifying the third node in the abstract syntax tree by using the predetermined object processing scheme corresponding to the predetermined locating information in the hook code file, to obtain the updated abstract syntax tree.

2. The method according to claim 1, wherein
the predetermined object processing scheme comprises an object replacement scheme or an object modification scheme; and
said modifying the node in the abstract syntax tree corresponding to the predetermined locating information by using the predetermined object processing scheme corresponding to the predetermined locating information in the hook code file, to obtain the updated abstract syntax tree comprises:
replacing the node in the abstract syntax tree corresponding to the predetermined locating information with a specified object in the object replacement scheme by using the object replacement scheme corresponding to the predetermined locating information in the hook code file, to obtain the updated abstract syntax tree; or
modifying a logic content in the node in the abstract syntax tree corresponding to the predetermined locating information by using the object modification scheme corresponding to the predetermined locating information in the hook code file, to obtain the updated abstract syntax tree.

3. The method according to claim 1, further comprising, prior to said receiving the hook code file and the target program source code:
receiving source code parameter information inputted by a user, and adding the source code parameter information to a predetermined file template; and
receiving an object processing scheme written into the predetermined file template to obtain the hook code file.

4. A non-transitory computer-readable storage medium, having instructions stored therein, wherein the instructions, when executed on a terminal device, cause the terminal device to:
receive a hook code file and a target program source code, wherein the hook code file comprises a correspondence between predetermined locating information and a predetermined object processing scheme, and the predetermined locating information is used for identifying an object in the target program source code;
convert the target program source code into an abstract syntax tree, and determine a node in the abstract syntax tree corresponding to the predetermined locating information in the hook code file, wherein the node in the abstract syntax tree is in correspondence with the object in the target program source code;
modify the node in the abstract syntax tree corresponding to the predetermined locating information by using the predetermined object processing scheme corresponding to the predetermined locating information in the hook code file, to obtain an updated abstract syntax tree; and
generate a target program based on the updated abstract syntax tree,
wherein the instructions, when executed on the terminal device, further cause the terminal device to, prior to said receiving the hook code file and the target program source code: mark locating information of a target object in the target program source code as the predetermined locating information based on a predetermined marking mechanism,
wherein the predetermined locating information comprises file position information, a class name, and a method name,
wherein the target program source code is a Dart program source code,
said determining the node in the abstract syntax tree corresponding to the predetermined locating information in the hook code file comprises:
determining nodes in the abstract syntax tree corresponding to the file position information in the predetermined locating information as first nodes based on the predetermined locating information in the hook code file;
determining nodes corresponding to the class name in the predetermined locating information from the first nodes as second nodes; and
determining a node corresponding to the method name in the predetermined locating information from the second nodes as a third node; and
said modifying the node in the abstract syntax tree corresponding to the predetermined locating information by using the predetermined object processing scheme corresponding to the predetermined locating information in the hook code file, to obtain the updated abstract syntax tree comprises:
modifying the third node in the abstract syntax tree by using the predetermined object processing scheme corresponding to the predetermined locating information in the hook code file, to obtain the updated abstract syntax tree.

5. A device, comprising:
a memory;
a processor; and
a computer program stored on the memory and executable on the processor,
wherein the processor, when executing the computer program, implements:
receiving a hook code file and a target program source code, wherein the hook code file comprises a correspondence between predetermined locating information and a predetermined object processing scheme, and the predetermined locating information is used for identifying an object in the target program source code;
converting the target program source code into an abstract syntax tree, and determining a node in the abstract syntax tree corresponding to the predetermined locating information in the hook code file, wherein the node in the abstract syntax tree is in correspondence with the object in the target program source code;

modifying the node in the abstract syntax tree corresponding to the predetermined locating information by using the predetermined object processing scheme corresponding to the predetermined locating information in the hook code file, to obtain an updated abstract syntax tree; and generating a target program based on the updated abstract syntax tree, wherein the processor, when executing the computer program, further implements, prior to said receiving the hook code file and the target program source code:

marking locating information of a target object in the target program source code as the predetermined locating information based on a predetermined marking mechanism, wherein the predetermined locating information comprises file position information, a class name, and a method name, wherein the target program source code is a Dart program source code, said determining the node in the abstract syntax tree corresponding to the predetermined locating information in the hook code file comprises:

determining nodes in the abstract syntax tree corresponding to the file position information in the predetermined locating information as first nodes based on the predetermined locating information in the hook code file;

determining nodes corresponding to the class name in the predetermined locating information from the first nodes as second nodes; and determining a node corresponding to the method name in the predetermined locating information from the second nodes as a third node; and said modifying the node in the abstract syntax tree corresponding to the predetermined locating information by using the predetermined object processing scheme corresponding to the predetermined locating information in the hook code file, to obtain the updated abstract syntax tree comprises:

modifying the third node in the abstract syntax tree by using the predetermined object processing scheme corresponding to the predetermined locating information in the hook code file, to obtain the updated abstract syntax tree.

6. A non-transitory computer program product, comprising a computer program/instructions, wherein the computer program/instructions, when executed by a processor, implement the method according to claim 1.

7. The computer-readable storage medium according to claim 4, wherein the predetermined object processing scheme comprises an object replacement scheme or an object modification scheme; and said modifying the node in the abstract syntax tree corresponding to the predetermined locating information by using the predetermined object processing scheme corresponding to the predetermined locating information in the hook code file, to obtain the updated abstract syntax tree comprises:

replacing the node in the abstract syntax tree corresponding to the predetermined locating information with a specified object in the object replacement scheme by using the object replacement scheme corresponding to the predetermined locating information in the hook code file, to obtain the updated abstract syntax tree; or modifying a logic content in the node in the abstract syntax tree corresponding to the predetermined locating information by using the object modification scheme corresponding to the predetermined locating information in the hook code file, to obtain the updated abstract syntax tree.

8. The computer-readable storage medium according to claim 4, wherein the instructions, when executed on the terminal device, further cause the terminal device to, prior to said receiving the hook code file and the target program source code:

receive source code parameter information inputted by a user, and add the source code parameter information to a predetermined file template; and receive an object processing scheme written into the predetermined file template to obtain the hook code file.

9. The device according to claim 5, wherein the predetermined object processing scheme comprises an object replacement scheme or an object modification scheme; and said modifying the node in the abstract syntax tree corresponding to the predetermined locating information by using the predetermined object processing scheme corresponding to the predetermined locating information in the hook code file, to obtain the updated abstract syntax tree comprises:

replacing the node in the abstract syntax tree corresponding to the predetermined locating information with a specified object in the object replacement scheme by using the object replacement scheme corresponding to the predetermined locating information in the hook code file, to obtain the updated abstract syntax tree; or modifying a logic content in the node in the abstract syntax tree corresponding to the predetermined locating information by using the object modification scheme corresponding to the predetermined locating information in the hook configuration file, to obtain the updated abstract syntax tree.

10. The device according to claim 5, wherein the processor, when executing the computer program, further implements, prior to said receiving the hook code file and the target program source code:

receiving source code parameter information inputted by a user, and adding the source code parameter information to a predetermined file template; and receiving an object processing scheme written into the predetermined file template to obtain the hook code file.

* * * * *